(12) United States Patent
Amendola

(10) Patent No.: US 7,140,187 B2
(45) Date of Patent: *Nov. 28, 2006

(54) UREA BASED COMPOSITION AND SYSTEM FOR SAME

(76) Inventor: Steven C. Amendola, 22 Lambert Johnson Dr., Ocean, NJ (US) 07712

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/408,731

(22) Filed: Apr. 7, 2003

(65) Prior Publication Data

US 2003/0219371 A1    Nov. 27, 2003

Related U.S. Application Data

(60) Provisional application No. 60/372,530, filed on Apr. 15, 2002.

(51) Int. Cl.
- F02C 6/18 (2006.01)
- C01B 21/02 (2006.01)
- C01B 3/02 (2006.01)
- C01C 1/08 (2006.01)

(52) U.S. Cl. .................. 60/780; 60/781; 423/351; 423/358; 423/648.1

(58) Field of Classification Search .......... 423/358, 423/351, 658.2, 648.1; 60/780, 781
See application file for complete search history.

(56) References Cited

U.S. PATENT DOCUMENTS

| | | | | |
|---|---|---|---|---|
| 2,601,221 A | * | 6/1952 | Cohn et al. | 252/375 |
| 5,252,308 A | * | 10/1993 | Young | 423/358 |
| 5,976,723 A | | 11/1999 | Boffito et al. | 429/17 |
| 5,985,224 A | * | 11/1999 | Lagana | 423/235 |
| 2002/0028171 A1 | * | 3/2002 | Goetsch et al. | 423/237 |

OTHER PUBLICATIONS

International search report.
"Structures and Catalytic Activities of Carboxylate-Bridged Dinickel(II) Complexes as Models for the Metal Center of Urease" by Yamaguchi et al., J. Am. Chem. Society, 1997, Nov. 18, 1996, pp. 5752-5753.
"Hydrolytically Active Tetranuclear Nickel Complexes with Structural Resemblance to the ActiveSite Urease" by Carlsson et al., Inorganic Chemistry Communication, vol. XX, No. XX, XXX, Jul. 2, 2002, (3 pages) EST: 2.8.

* cited by examiner

Primary Examiner—Wayne A. Langel
(74) Attorney, Agent, or Firm—Baker Botts LLP

(57) ABSTRACT

A method and apparatus for generating energy from a composition comprising urea and water are described. The method in one embodiment includes: (a) reacting the urea with water to form ammonia; and (b) oxidizing the ammonia formed in step (a) to form water and nitrogen generating energy. The apparatus in one embodiment contains: (a) a first container for providing the composition; (b) a second container for reacting the urea with water to form ammonia, wherein the second container is connected to the first container by means for delivering the composition from the first container to the second container; (c) a third container for providing ammonia, wherein the third container is connected to the second container by means for delivering ammonia from the third container to the second container; and (d) a fourth container for oxidizing ammonia to form water and nitrogen generating energy, wherein the fourth container is connected to the second container by means for delivering ammonia from the second container to the fourth container. The method and apparatus are used to generate energy for use in stationary and mobile applications.

44 Claims, 7 Drawing Sheets

UREA BASED COMPOSITION AND SYSTEM FOR SAME

CROSS-REFERENCE TO RELATED APPLICATIONS

This application claims priority from U.S. Provisional Patent Application Ser. No. 60/372,530, filed Apr. 15, 2002.

FIELD OF THE INVENTION

The present invention relates to a urea based composition, and more particularly to a composition containing urea and water. The present invention also relates to a method for generating energy from a urea based composition.

BACKGROUND OF INVENTION

Fossil fuels constitute the largest source of energy supply in the world. Their availability in large quantities, high energy density, and relatively low cost makes fossil fuels the fuel of choice for many applications for both industries and consumers. Nonetheless, an alternative to fossil fuels as an energy source is highly desirable for safety reasons, for environmental reasons, and to reduce the dependence of the industrialized world on oil imported from relatively few oil-producing countries. In spite of these compelling arguments in favor of new energy sources, no economical, safe and readily available fuel has been found to be a viable alternative for fossil fuels, especially in automotive and portable power applications, even though extensive research has been aimed at developing a fuel having the many positive characteristics of gasoline without its drawbacks.

A new, alternative fuel should fulfill several requirements. The cost of the fuel should be competitive with the cost of current energy sources. The fuel should have no undesirable emissions. It should have a high energy density, as gasoline does, to avoid the need for frequent refilling. The fuel should be easy to handle. Preferably, it should be non-flammable and nontoxic, and have a pH as close to 7 as possible. Finally, it should be universally available through a reliable distribution infrastructure that can be readily expanded. There is therefore a need in the art for a fuel having all of the above characteristics.

Current efforts directed to new fuels have not provided a fuel that is cost effective compared to gasoline. Furthermore, the effectiveness of any of the proposed alternatives as a source of energy appears problematic. For example, although hydrogen may be obtained from fossil or non-fossil sources, problems related to handling during transportation and to storage make hydrogen a poor chioce for a consumer-oriented fuel. Other fuels, such as methanol, are toxic and flammable and still require a certain amount of fossil fuel, in the form of either natural gas or carbon monoxide, to be economically produced. Sources of hydrogen such as chemical hydrides, while easy and effective to use, require a recycle loop if it is desired to re-utilize the hydrides, as discussed in U.S. Pat. Nos. 5,804,329 and 6,534,033.

All fossil fuel type reformers require crude oil based liquid fuels and therefore do not alleviate the need for fossil fuels. It is also questionable whether the cost of such reformers may become economical or whether the net "well to wheel" efficiency of such a system may ever match that of a high compression ratio engine. Therefore, it is desirable to provide a fuel that may be used safely within the existing infrastructure, and which at the same time may function as a non-fossil source without causing an increase change in cost at the fuel pump. For example, urea is currently made in very large quantites at a price which can allow it to be competitive with gasoline. It is currently made from hydrogen obtained from natural gas, thereby avoiding the need to import oil. At the same time, the source of hydrogen is flexible, so that non-fossil hydrogen sources may be seamlessly substituted for fossil hydrogen sources to produce urea.

SUMMARY OF THE INVENTION

Accordingly, it is an object of the invention to provide a method for generating energy from a composition comprising urea and water. The method in a first embodiment comprises: (a) reacting the urea with water to form ammonia; and (b) oxidizing the ammonia formed in step (a) to form water and nitrogen generating energy.

The method in a second embodiment comprises: (a) reacting the urea with water to form ammonia; (b) converting the ammonia formed in step (a) into nitrogen and hydrogen; and (c) oxidizing the hydrogen formed in step (b) to form water generating energy.

The method in a third embodiment comprises: (a) reacting the urea with water in the of an oxidizing agent to form hydrogen; and (b) oxidizing the hydrogen formed in step (a) to form water generating energy.

The method in a fourth embodiment comprises oxidizing the urea with an oxidizing agent to form water generating energy.

The method in a fifth embodiment comprises: (a) reacting the urea with water to form ammonia; (b) dividing the ammonia formed in step (a) into a first portion and a second portion; (c) converting the first portion of ammonia into nitrogen and hydrogen; and (d) oxidizing the hydrogen formed in step (c) and the second portion of ammonia to form nitrogen and water generating energy.

It is another object of this invention to provide a method for driving a pneumatic device, the method comprising: (a) providing a composition comprising urea and water; (b) oxidizing the urea with an oxidizing agent in the presence of a catalyst to generate energy and form a plurality of gaseous substances under pressure; and (c) directing the gaseous substances formed under pressure into the pneumatic device to drive the pneumatic device.

It is another object of the invention to provide an apparatus for generating energy from a composition comprising urea and water. The apparatus in a first embodiment comprises: (a) a first container for providing the composition; (b) a second container for reacting the urea with water to form ammonia, wherein the second container is connected to the first container by means for delivering the composition from the first container to the second container; (c) a third container for providing ammonia, wherein the third container is connected to the second container by means for delivering ammonia from the third container to the second container; and (d) a fourth container for oxidizing ammonia to form water and nitrogen generating energy, wherein the fourth container is connected to the second container by means for delivering ammonia from the second container to the fourth container.

The apparatus in a second embodiment comprises: (a) a first container for providing the composition; (b) a second container for reacting the urea with water to form ammonia, wherein the second container is connected to the first container by means for delivering the composition from the first container to the second container; (c) a third container for providing ammonia, wherein the third container is connected to the second container by means for delivering ammonia from the third container to the second container; (d) a fourth container for converting ammonia into nitrogen and hydrogen, wherein the fourth container is connected to the second container by means for delivering ammonia from the second container to the fourth container; (e) a fifth container for providing hydrogen, wherein the fifth container is connected to the fourth container by means for delivering hydrogen from the fifth container to the fourth container; and (f) a sixth container for oxidizing hydrogen to form water generating energy, wherein the sixth container is connected to the fourth container by means for delivering hydrogen from the fourth container to the sixth container.

The apparatus in a third embodiment comprises: (a) a first container for providing the composition; (b) a second container for reacting the urea with water in the absence of an oxidizing agent to form hydrogen, wherein the second container is connected to the first container by means for delivering the composition from the first container to the second container; (c) a third container for providing hydrogen, wherein the third container is connected to the second container by means for delivering hydrogen from the third container to the second container; and (d) a fourth container for oxidizing hydrogen to form water generating energy, wherein the fourth container is connected to the second container by means for delivering hydrogen from the second container to the fourth container.

The apparatus in a fourth embodiment comprises: (a) a first container for providing the composition; and (b) a second container for oxidizing the urea with an oxidizing agent to form water generating energy, wherein the second container is connected to the first container by means for delivering the composition from the first container to the second container.

The apparatus in a fifth embodiment comprises: (a) a first container for providing the composition; (b) a second container for reacting the urea with water to form ammonia, wherein the second container is connected to the first container by means for delivering the composition from the first container to the second container; (c) a third container for providing ammonia, wherein the third container is connected to the second container by means for delivering ammonia from the third container to the second container; (d) a fourth container for converting a first portion of the ammonia formed in the second container into nitrogen and hydrogen, wherein the fourth container is connected to the second container by means for delivering the first portion of ammonia from the second container to the fourth container; (e) a fifth container for providing hydrogen, wherein the fifth container is connected to the fourth container by means for delivering hydrogen from the fifth container to the fourth container; and (f) a sixth container for oxidizing hydrogen and a second portion of the ammonia formed in the second container to form nitrogen and water generating energy, wherein the sixth container is connected to the fourth container by means for delivering hydrogen from the fourth container to the sixth container, and wherein the sixth container is connected to the second container by means for delivering the second portion of ammonia from the second container to the sixth container.

It is another object of the invention to provide an apparatus for generating energy from a composition comprising urea and water, the apparatus comprising a fuel cell capable of utilizing urea as a fuel, wherein the cell is selected from the group consisting of a low temperature fuel cell and a high temperature fuel cell and electricity is generated directly from urea by passing the urea through the fuel cell.

As is further discussed below, the composition comprising urea and water represents a suitable alternative to fossil fuels. Although gasoline has a more favorable cost per unit energy than the present invention, the composition comprising urea and water has a more favorable cost per unit volume than gasoline. The composition is environmentally friendly and easy to handle. Urea is non-toxic and non-flammable. Since urea is already used on a large scale as a fertilizer, it is also widely available through a reliable distribution infrastructure.

DETAILED DESCRIPTION OF THE INVENTION

Figure 1:
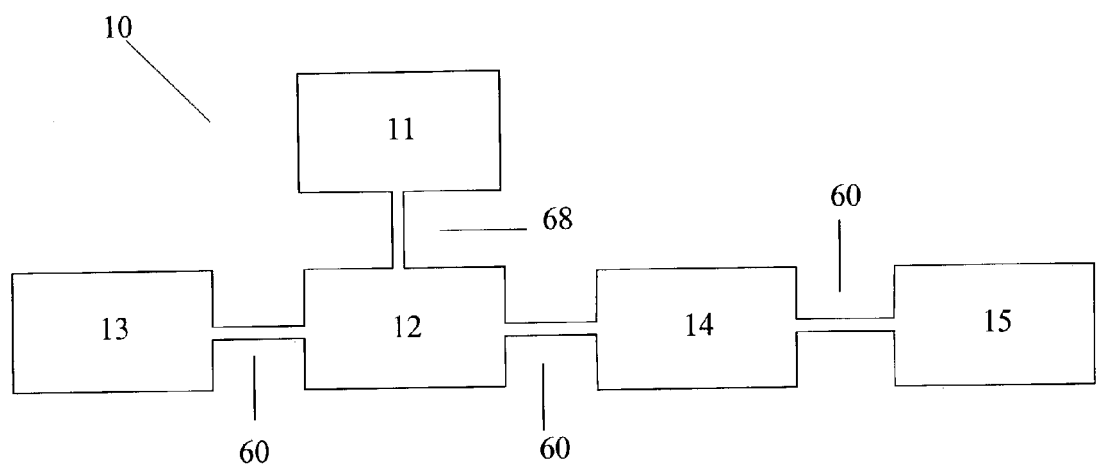
FIG. 1 shows a schematic description of a first embodiment of the apparatus of the invention.

Commercial urea is not 100% pure urea. Accordingly, the term "urea" as used herein is intended to denote any one or the components of commercial urea, including urea, $NH_2CONH_2$, ammonium carbamate, ammonium carbonate, ammonium bicarbonate, ammonium formate, ammonium acetate, or a mixture of two or more of these components.

As used herein, the term "enzyme capable of catalyzing the reaction of urea with water" is intended to denote any enzyme capable of catalyzing the reaction of urea with water. As used herein, the term "catalyst capable of catalyzing the reaction of urea with water" is intended to denote any catalyst, preferably a non-enzymatic catalyst, capable of catalyzing the reaction of urea with water.

As used herein, the term "non-enzymatic catalyst" is intended to denote any catalyst that is not an enzyme and does not comprise an enzyme as a catalytic moiety.

The reaction of urea with water can be described by the following stoichiometric equation:

$$NH_2CONH_2 + H_2O \rightarrow 2NH_3 + CO_2 \quad \Delta G = +28 \text{ Kcal/mol} \qquad (1)$$

Reaction (1) is preferably carried out at a temperature ranging between about 140° C. and about 240° C. and a pressure ranging between about 30 and about 50 atmospheres. The heat required for reaction (1), which is endothermic, may be obtained from waste heat generated by an engine or fuel cell in which urea, ammonia, or hydrogen is combusted or oxidized. This heat source may be supplemented with an additional energy source, particularly to initiate reaction (1). A preferred additional energy source is a battery which may be part of the apparatus of the invention and which serves as a source of electricity.

The weight of urea in the composition may range between about 10% and about 90% of the composition. In one embodiment, the weight of the urea ranges between about 30% and about 70% of the weight of water. In one exemplary embodiment, the composition is a solution containing a weight of urea equal to 50% of the weight of water. This composition is known in the fertilizer industry as fertilizer 46-0-0. 10 million tons per year of fertilizer 46-0-0 are produced in the United States alone. In another exemplary embodiment, the composition contains a weight of urea equal to 70% of the weight of water. This amount corresponds to the stoichiometric amount for equation (1). A composition containing a weight of urea equal to 70% of the weight of water is known in commerce as urea liquor or fertilizer 32-0-0. Urea liquor is maintained and shipped at a temperature of 135° F. to prevent the urea from crystallizing out of the aqueous phase. Urea liquor may be handled at this temperature anywhere along the distribution chain. Similarly, the system in which urea liquor is used as an energy source, which can be an automobile or a portable or stationary power plant, may be designed to handle the urea liquor at this temperature if desired. Alternatively, the composition containing a weight of urea equal to 70% of the weight of water may be a slurry of urea in water. For the purposes of the present invention, the slurry may be used at a temperature between room temperature and 135° F.

The composition may contain a component selected from the group consisting of a combustible fuel, a combustion enhancer, and a combination thereof. In the first, second and fifth embodiment of the method of the invention, the combustible fuel is present in an amount which can be combusted to generate a sufficient amount of heat to initiate the reaction of urea with water to form ammonia. In the third embodiment of the method of the invention, the combustible fuel is present in an amount which can be combusted to generate a sufficient amount of heat to initiate the reaction of urea with water in the absence of an oxidizing agent to form hydrogen. In the fourth embodiment of the invention, the combustible fuel is present in an amount which can be combusted to generate a sufficient amount of heat to initiate the oxidation of urea with an oxidizing agent to form water.

The oxidation of hydrogen to form water may be performed by combusting the hydrogen in an engine. Similarly, the oxidation of ammonia to form nitrogen and water may be performed by combusting the ammonia in an engine. Alternatively, the ammonia and hydrogen may be oxidized in an ammonia fuel cell and a hydrogen fuel cell, respectively. Examples of fuel cells include high temperature fuel cells such as solid oxide fuels cell and molten carbonate fuel cells, and relatively low lower temperature fuel cell such as alkaline-fuel cells and phosphoric acid fuel cells.

The combustion of ammonia to form water and nitrogen may also lead to the formation of nitrogen oxides which have the general formula $N_xO_y$, such as, for example, NO or $NO_2$. Elevated levels of the nitrogen oxides are obtained depending upon reaction conditions. The nitrogen oxides are pollutants and their emission is regulated. An advantage of using a composition as the fuel in the present invention is that pollution caused by the nitrogen oxides may be abated or eliminated by introducing a small amount of urea either in the combustion chamber or in a post combustion reactor. The urea acts as a reducing agent to convert nitrogen oxides into molecular nitrogen according to the well-known reaction described in equation (2):

$$NH_2CONH_2 + NO + NO_2 \rightarrow 2N_2 + 2H_2O + CO_2 \quad (2)$$

The reaction shown in equation (2) has been described in several patents as a way to reduce $N_xO_y$ in both mobile and stationary combustion sources. Representative patents include U.S. Pat. Nos. 5,399,325, 6,403,046, 6,354,079, 6,312,650, 6,182,443, 6,146,605, 5,832,720, 5,746,144, 5,399,326, 5,281,403 and 5,240,689.

While urea and ammonia have been used as stationary source pollutant removers, these compounds have not been used for mobile applications, possibly because most consumers would not notice any change in the performance of the vehicle in the absence of the pollutant remover and would therefore forget to refill the tank containing the pollutant remover. Accordingly, manufacturers are looking for a solution that does not require a second fill-up in addition to the one required for the fuel. Currently, the solutions to this problem are to include three way catalysts as additives to the fuel or to feed small amounts of gasoline into an exhaust reactor.

The composition comprising urea and water provides a simple and efficient solution to the problem of pollution caused by nitrogen oxides. Since urea acts as both the fuel and the $NO_x$ reducing agent, an apparatus that uses urea as the fuel also provides for its own pollution abatement. As long as there is fuel to run a vehicle there is also material to remove the $NO_x$ produced by the combustion of the fuel. Accordingly, consumers would only require one fill-up, since the same substance would serve both purposes.

An example of a suitable combustible fuel is ammonia. The amount of ammonia used is preferably an amount of ammonia sufficient to initiate the reaction of equation (1). This amount is limited by pH concerns and odor concerns. Preferably, ammonia is provided in a buffer tank. The ammonia in the buffer tank also compensates for the difference between the production rate of ammonia from urea and the consumption rate of ammonia, which is either oxidized or forms hydrogen which is then oxidized, as is further discussed below. Ammonia can also be generated from one or more nitrogen based compounds. Preferably, the one or more nitrogen based compounds are selected from the group consisting of ammonium carbamate, ammonium carbonate, ammonium bicarbonate, biuret, ammonium formate, hydrazine, hydroxylamine, and a mixture thereof. The use of such nitrogen based compounds ensures that the only products of the decomposition of these compounds are ammonia and other harmless compounds including as carbon dioxide, nitrogen, and water.

The composition may also include a combustion enhancer. Preferred combustion enhancers include ammonium nitrate, ammonia, hydrazine, and certain water soluble compounds which can be made from renewable sources or waste, such as isopropanol, ethanol and methanol. In addition to favoring combustion, such combustion enhancers may also help decrease the freezing point of the fuel.

Several embodiments can be used to generate energy from the composition comprising urea and water according to the method of the invention. In a first embodiment, the urea reacts with water to form ammonia, according to equation (1). The ammonia formed from the reaction of urea with water is then oxidized to form water and nitrogen generating energy. The oxidation of ammonia may be performed by combusting the ammonia in an engine. The engine may be an engine having a compression ratio at least similar to compression ratios ordinarily used in the art, such as a compression ratio of 9:1, or a compression ratio higher than compression ratios ordinarily used in the art, such as a compression ratio of 30:1 or greater, or a compression ratio ranging between 9:1 and 30:1. Alternatively, the ammonia may be heated in an ammonia fuel cell. The first embodiment of the method of the invention may further include the step of reacting a sufficient amount of the composition with nitrogen oxides formed from the combustion of ammonia to reduce the nitrogen oxides.

In a second embodiment of the method of the invention, the urea in the composition reacts with water to form ammonia, according to equation (1). The ammonia formed from the reaction of urea with water is then 'reformed' or converted into nitrogen and hydrogen. The hydrogen formed from the conversion of ammonia is then oxidized to form water generating energy. The oxidation of hydrogen may be performed by combusting the hydrogen in an engine. Alternatively, the hydrogen may be heated in a hydrogen fuel cell. The amount of energy required for this reaction can be provided by an electric heater or by the oxidation of a small amount of hydrogen in situ.

In the second embodiment of the method of the invention, the ammonia formed from the reaction of urea with water may be mixed with or contacted with a catalyst capable of catalyzing the conversion of ammonia into nitrogen and hydrogen. The catalyst is preferably an oxide of a transition metal. More preferably, the catalyst is iron (II) oxide or iron (III) oxide.

In a third embodiment of the method of the invention, the urea reacts with water in the absence of an oxidizing agent to form hydrogen in one step. The composition may be heated at a temperature ranging between about 150° C. and 250° C. and a pressure ranging between about 30 and about 50 atmospheres according to equation (3) below. Alternatively, the reaction may be performed in a urea fuel cell operating at a temperature from ranging from about room temperature to about 200° C., preferably to about 70° C., or in a solid oxide fuel cell (SOFC) or molten carbonate fuel cell operating at a temperature between about 700° C. and about 1000° C.

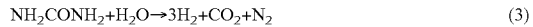

$$NH_2CONH_2 + H_2O \rightarrow 3H_2 + CO_2 + N_2 \qquad (3)$$

Without wishing to be bound by theory or mechanism, it is believed that the urea in the reaction of equation (3) reacts with water to form ammonia which is converted into nitrogen and hydrogen. The hydrogen is then oxidized to form water generating energy. The oxidation of hydrogen may be performed by combusting the hydrogen in an engine. Alternatively, the hydrogen may be heated in a hydrogen fuel cell.

In the third embodiment, the composition may be mixed or contacted with a catalyst capable of catalyzing the reaction of urea with water in the absence of an oxidizing agent to form hydrogen. Alternatively, the urea may react with water to form hydrogen in the absence of a catalyst. The heat required for reaction (3) may be obtained from the exhaust heat, or from the heat generated from the combustion of hydrogen in a buffer tank. Accordingly, it is not necessary to provide a separate source of energy to heat the catalyst.

In a fourth embodiment, the urea is oxidized with an oxidizing agent to form water generating energy. In this embodiment, the composition may be heated at a temperature ranging between about 150° C. and 250° C. and a pressure ranging between about 30 and about 50 atmospheres. Alternatively, the reaction may be performed in a urea fuel cell operating at a temperature from ranging from about room temperature to about 200° C., preferably to a temperature under the boiling point of water, such as about 70° C., or in a solid oxide fuel cell (SOFC) or molten carbonate fuel cell operating at a temperature between about 700° C. and about 1000° C.

In the fourth embodiment, the composition may be mixed or contacted with a catalyst capable of catalyzing the oxidation of urea to form water. The catalyst may be a catalyst comprising a transition metal, a rare earth element, an actinide, or a combination thereof. The transition metal is preferably platinum, palladium, nickel, cobalt, iron copper, zinc, titanium, vanadium, molybdenum, rhodium, ruthenium, zirconium, tungsten, rhenium, silver, or gold. Alternatively, the urea may be oxidized in the absence of a catalyst. For example, the urea may be oxidized by hypobromite ($^-$OBr). The hypobromite is converted to bromide which is subsequently reoxidized to hypobromite by air.

In a fifth embodiment, the urea reacts with water to form ammonia. The ammonia is then separated into a first portion and a second portion. The first portion of ammonia is then converted into nitrogen and hydrogen. The hydrogen and the second portion of ammonia are then oxidized to form water and nitrogen generating energy. The oxidation of hydrogen and the second portion of ammonia preferably comprises mixing the hydrogen and the second portion of ammonia to form a mixture comprising the hydrogen and the second portion of ammonia, and oxidizing the mixture. The oxidation of the hydrogen and of the second portion of ammonia may be performed by combusting the hydrogen and the second portion of ammonia in an engine. Alternatively, the hydrogen and the second portion of ammonia may be heated in a fuel cell, such as solid oxide fuel cell, using a suitable catalyst. The fifth embodiment of the method of the invention may further include the step of reacting a sufficient amount of the composition with nitrogen oxides formed from the combustion of the second portion of ammonia in an engine to reduce the nitrogen oxides.

In the fifth embodiment, the first portion of ammonia may be mixed with or contacted with a catalyst capable of catalyzing the conversion of ammonia into nitrogen and hydrogen. The catalyst is preferably an oxide of a transition metal. More preferably, the catalyst is iron (II) oxide or iron (III) oxide.

The fifth method of the invention combines the advantageously high compression ratio of ammonia with the wide flammability range of hydrogen and the high flame speed of the hydrogen flame. The molar ratio of the first portion of ammonia to the second portion of ammonia may be varied between 99.9:0.1 and 0.1:99.9, for example, between 95:5 and 5:95. In an exemplary embodiment of the invention, the molar ratio of the first portion of ammonia to the second portion of ammonia is 95:5.

In the first, second and fifth embodiments of the method of the invention, the reaction of urea with water to form ammonia according to equation (1) may be performed at a temperature of about 500° C. The reaction may be performed by mixing or contacting the composition with a catalyst capable of catalyzing the reaction of urea with water to form ammonia. The catalyst may be a metal oxide. In an exemplary embodiment, the catalyst is an oxide of iron, nickel, vanadium or zinc.

In the first, second and fifth embodiments of the method of the invention, the reaction of urea with water to form ammonia according to equation (1) may be performed by mixing or contacting the composition with an enzyme capable of catalyzing the reaction of urea with water to form ammonia. The use of an enzyme is advantageous if the automotive, portable or stationary system which uses the composition comprising urea and water as an energy source must be maintained at a temperature which is too low for the reaction of equation (1) to proceed in the absence of an enzyme. The composition comprising urea and water may be transferred from a container to a reactor containing the enzyme. As the volume of the composition comprising urea and water decreases in the course of the reaction, additional amounts of the composition comprising urea and water are transferred to the reactor. The method may further comprise adding additional amounts of the enzyme to the reaction mixture in the course of the reaction as needed.

The use of an enzyme allows the reaction of urea with water to proceed at lower temperatures than the reaction in the absence of the enzyme. The temperature of the enzyme-catalyzed reaction may range between room temperature and a temperature at which the half life of the enzyme is less than 1 minute. The enzyme may be provided in a tank equipped with a filter which prevents the enzyme from leaving but which is permeable to the gases formed Alternatively, the enzyme may be immobilized on a substrate. Suitable substrates include ion exchange resins, ceramics, and polymeric materials. The substrate may be in the form of a sheet or beads.

In an exemplary embodiment, the enzyme capable of catalyzing the reaction of urea with water to form ammonia is urease. The urease catalyzes the reaction at a temperature which is preferably between about 0° C. and about 60° C., more preferably about 60° C. The heat required to maintain the process at this temperature is available from proton exchange membrane (PEM) fuel cell stacks which may be easily integrated into the apparatus of the invention to provide a low temperature energy sink.

Alternatively, a synthetic urease may be used instead of urease. Suitable synthetic ureases include organic compounds containing nickel, such as organic compounds containing nickel in the +2 oxidation state. It has been found that several nickel compounds can hydrolyse urea, as discussed, for example, in Yamaguchi et al., "Structures and catalytic Activities of Carboxylate-Bridged Dinickel (II) Complexes as Models for the Metal Center of Urease," *Journal of the American Chemical Society*, Vol. 119 (1997), pp. 5752–53, and Carlsson et al., "Hydrolytically Active Tetranuclear Nickel Complexes with Structural Resemblance to the Active Site of Urease," *Inorganic Chemistry C*, published on the Internet as Vol. xx (xxxx).

The present invention also provides a method for driving a pneumatic device. Oxidation of the urea in the composition containing urea and water with an oxidizing agent in the presence of a catalyst may generate energy and form a plurality of gaseous substances under pressure. The gaseous substances are then directed into the pneumatic device to drive the device. The oxidizing agent which is used to oxidize the urea may be any oxidizing agent which is capable of delivering an oxygen atom or atoms or a molecule or ion containing one or more oxygen atoms or which is capable of accepting electrons from the urea. Suitable examples are oxygen ($O_2$) and hypobromite. For example, the oxidation proceeds according to equation (4.1) when oxygen is the oxidizing agent, and according to equation (4.2) when hypobromite is the oxidizing agent. The bromide ($Br^-$) formed in reaction (4.2) may be reoxidized by air and an oxidation catalyst to regenerate the reactant hypobromite $BrO^-$.

$$(NH_2)_2CO + O_2 \rightarrow N_2 + CO_2 + 2H_2O \quad (4.1)$$

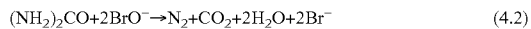
$$(NH_2)_2CO + 2BrO^- \rightarrow N_2 + CO_2 + 2H_2O + 2Br^- \quad (4.2)$$

Reactions (4.1) and (4.2) are exothermic reactions which generates nitrogen ($N_2$), carbon dioxide ($CO_2$) and water as gaseous substances. The gaseous substances may be directed into a pneumatic device to drive the pneumatic device and perform work in the device, which can be any kind of gas-powered apparatus such as a turbine, an air motor, a piston motor, and the like. Additional amounts of the gaseous substances may be stored under pressure in one or more buffer tanks. Each buffer tank may be connected to the pneumatic device so that the additional amounts of the gaseous substances may be provided to the device to start the device or to compensate for variations in the amounts of the gaseous substances formed from reactions (4.1) and (4.2) which are directed into the device.

The invention is also directed to an apparatus for generating energy from urea. In one embodiment of the invention, shown in FIG. 1, the apparatus 10 includes a container such as tank 11 for providing the composition. The composition is delivered from tank 11 to a container such as reactor 12 for reacting the urea with water to form ammonia. The reactor 12 for reacting the urea with water may be a container for providing a catalyst capable of catalyzing the reaction of urea with water or an enzyme capable of catalyzing the reaction of urea with water. The apparatus may also include a container such as buffer tank 13 for providing ammonia which is connected to the reactor. The buffer tank 13 may be a container for containing an amount of ammonia which can be combusted to generate a sufficient amount of heat to initiate the reaction of the urea with water, preferably to instantly initiate the reaction of the urea with water. The buffer tank 13 also compensates for the difference between the production rate of ammonia from urea and the consumption rate of ammonia. The ammonia produced from the reaction of urea with water is delivered from the reactor 12 to a container such as chamber 14 for oxidizing ammonia to form water and nitrogen generating energy.

In one exemplary embodiment, chamber 14 is an ammonia fuel cell.

In another exemplary embodiment, the chamber 14 is an engine and the ammonia is oxidized by combusting it in the engine. In this exemplary embodiment, the apparatus may also include a container such as post-combustion reactor 15 connected to the engine for providing a sufficient amount of the composition to reduce the nitrogen oxides which are formed as by-products of the combustion of ammonia. The nitrogen oxides are delivered to the post-combustion reactor 15 and are reduced by the urea in the composition to form nitrogen.

Figure 2:
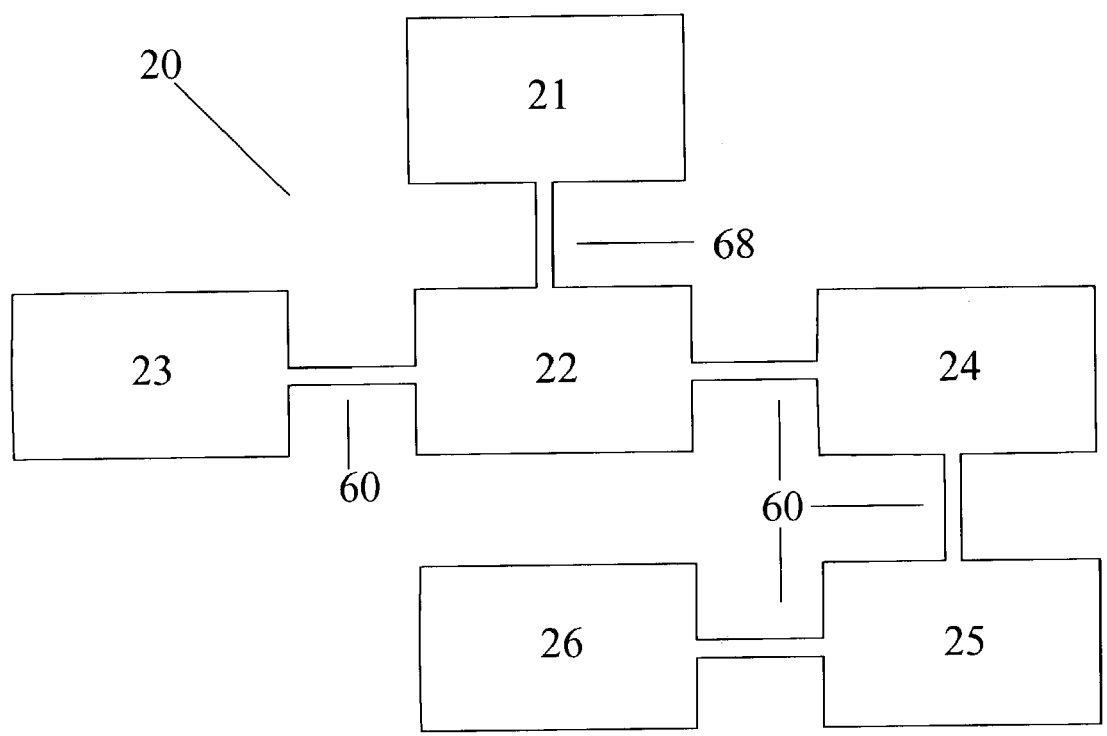
FIG. 2 shows a schematic description of a second embodiment of the apparatus of the invention.

In another embodiment of the apparatus of the invention, shown in FIG. 2, the apparatus 20 includes a container such as tank 21 for providing the composition. The fuel is delivered to a container such as first reactor 22 for reacting the urea with water to form ammonia. The first reactor 22 for reacting the urea with water may be a container for providing a catalyst capable of catalyzing the reaction of urea with water or an enzyme capable of catalyzing the reaction of urea with water. The apparatus may also include a container such as buffer tank 23 for providing ammonia which is connected to the first reactor 22. The buffer tank 23 may be a container for providing an amount of ammonia which can be combusted to generate a sufficient amount of heat to initiate the reaction of the urea with water, preferably to instantly initiate the reaction of the urea with water. The ammonia produced from the reaction of urea with water is delivered from the first reactor 22 to a container such as second reactor 24 for converting the ammonia into nitrogen and hydrogen. The hydrogen formed from the conversion of ammonia is delivered from the second reactor 24 to a container such as chamber 25 for oxidizing the hydrogen to form water generating energy. In one exemplary embodiment, chamber 25 is a hydrogen fuel cell. In another exemplary embodiment, the chamber 25 is an engine and the hydrogen is oxidized by combusting it in the engine. The apparatus may also include a container such as buffer tank 26 for providing hydrogen which is connected to the chamber 25. The buffer tank 26 compensates for the difference between the production rate of hydrogen from the reformation of ammonia and the consumption rate of hydrogen.

Figure 3:
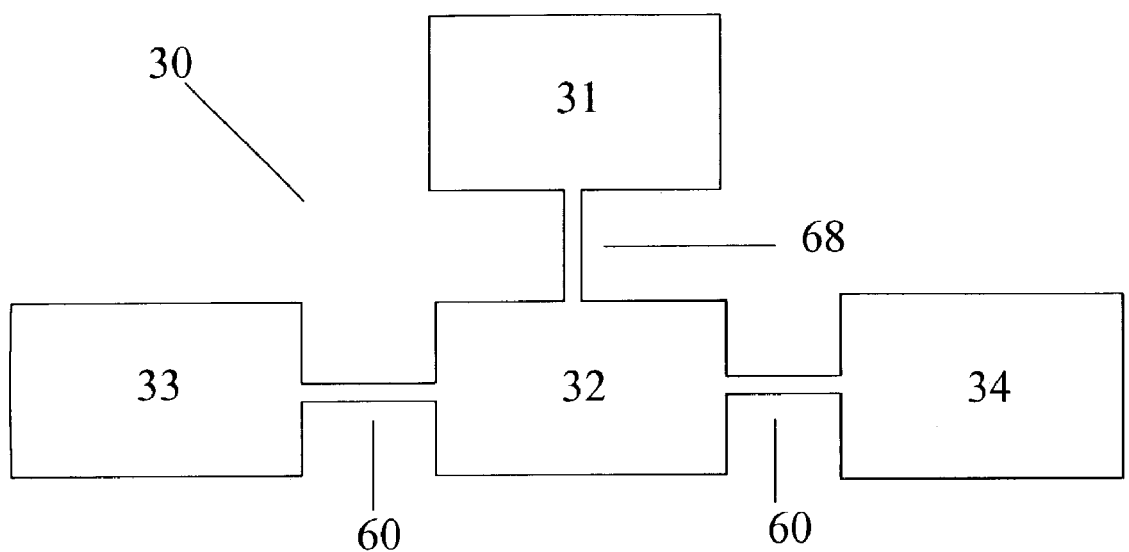
FIG. 3 shows a schematic description of a third embodiment of the apparatus of the invention.

In another embodiment of the invention, shown in FIG. 3, the apparatus 30 includes a container such as tank 31 for providing the composition. The composition is delivered from the tank to a container such as reactor 32 for reacting the urea with water to form hydrogen. The reactor 32 for reacting the urea with water in the absence of an oxidizing agent to form hydrogen may be a container for providing a catalyst capable of catalyzing the reaction of urea with water to form hydrogen. The apparatus may also include a container such as buffer tank 33 for providing hydrogen which is connected to the reactor. The buffer tank 33 may be a container for containing an amount of hydrogen which can be combusted to generate a sufficient amount of heat to initiate the reaction of the urea with water to form hydrogen, preferably to instantly initiate the reaction of the urea with water to form hydrogen. The buffer tank 33 also compensates for the difference between the production rate of hydrogen and the consumption rate of hydrogen. The hydrogen produced from the reaction of urea with water is delivered from the reactor 32 to a container such as chamber 34 for oxidizing hydrogen to form water generating energy. In one exemplary embodiment, chamber 34 is a hydrogen fuel cell. In another exemplary embodiment, the chamber 34 is an engine and the hydrogen is oxidized by combusting it in the engine.

Figure 4:
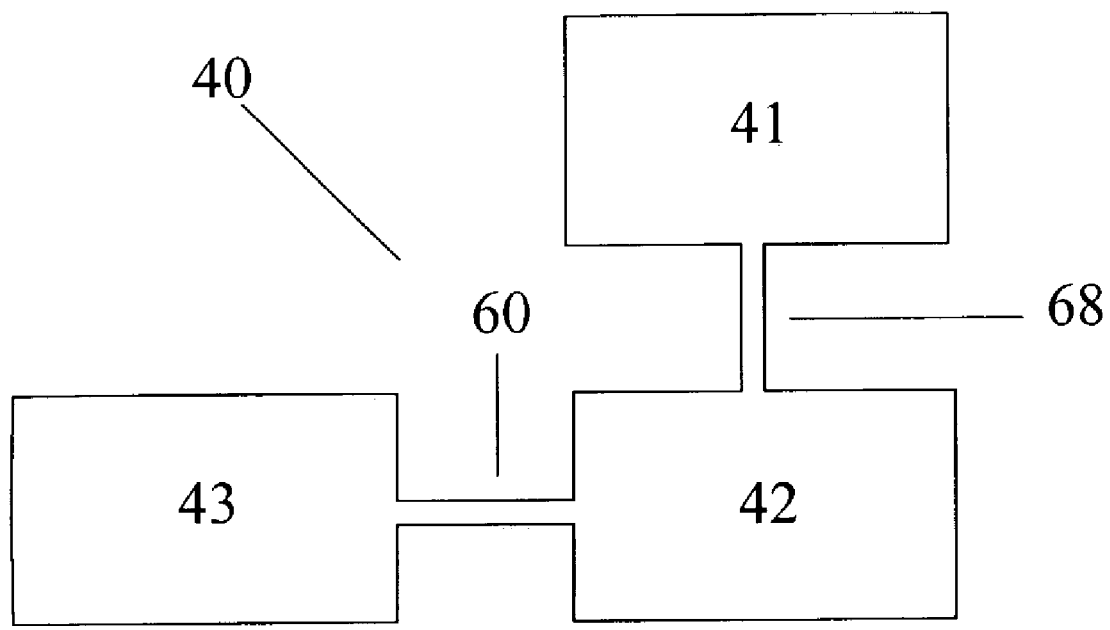
FIG. 4 shows a schematic description of a fourth embodiment of the apparatus of the invention.

In another embodiment of the apparatus of the invention, shown in FIG. 4, the apparatus 40 includes a container such as tank 41 for providing the composition. The composition is delivered to a container such as chamber 42 for oxidizing the urea to generate energy. The chamber 42 for oxidizing the urea may be a container for providing a catalyst capable of catalyzing the oxidation of urea. In one exemplary embodiment, chamber 42 is a urea fuel cell. In another exemplary embodiment, the chamber 42 is an engine and the urea is oxidized by combusting it in the engine. The apparatus may also include a container such as starter tank 43 for providing ammonia. The starter tank 43 is connected to the chamber 42. The starter tank 43 may be a container for providing an amount of ammonia which can be combusted to generate a sufficient amount of heat to initiate the oxidation of urea, preferably to instantly initiate the oxidation of urea.

Figure 5:
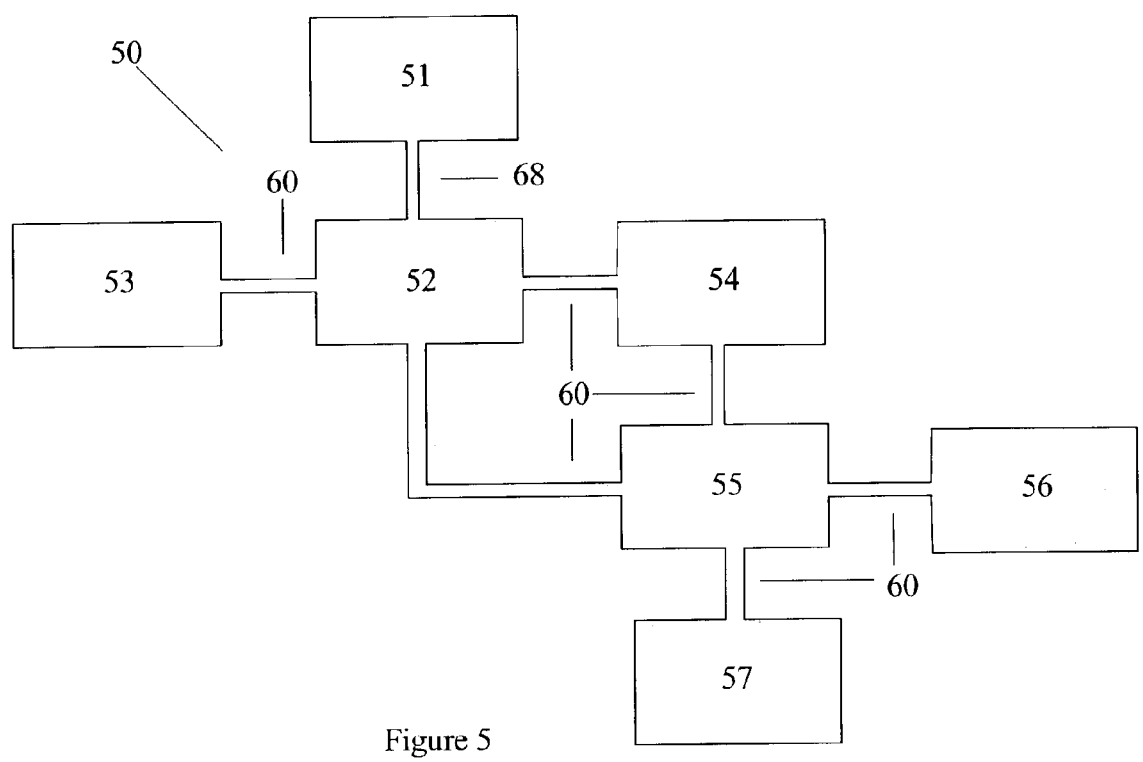
FIG. 5 shows a schematic description of a fifth embodiment of the apparatus of the invention.

In another embodiment of the apparatus of the invention, shown in FIG. 5, the apparatus 50 includes a container such as tank 51 for providing the composition. The fuel is delivered to a container such as first reactor 52 for reacting the urea with water to form ammonia. The first reactor 52 for reacting the urea with water may be a container for providing a catalyst capable of catalyzing the reaction of urea with water or an enzyme capable of catalyzing the reaction of urea with water. The apparatus may also include a container such as buffer tank 53 for providing ammonia which is connected to the first reactor 52. The buffer tank 53 may be a container for providing an amount of ammonia which can be combusted to generate a sufficient amount of heat to initiate the reaction of the urea with water, preferably to instantly initiate the reaction of the urea with water. A first portion of the ammonia formed from the reaction of urea with water is delivered from the first reactor 52 to a container such as second reactor 54 for converting the first portion of ammonia into nitrogen and hydrogen. The hydrogen formed from the conversion of the first portion of ammonia is delivered from the second reactor 54 to a container such as chamber 55. A second portion of the ammonia produced from the reaction of urea with water is delivered from the reactor 52 to chamber 55. Chamber 55 is a container for oxidizing hydrogen and the second portion of ammonia to form water and nitrogen generating energy. The apparatus may also include a container such as buffer tank 56 for providing hydrogen which is connected to the chamber 55. The buffer tank 56 compensates for the difference between the production rate of hydrogen from the reformation of ammonia and the consumption rate of hydrogen.

In one exemplary embodiment, chamber 55 is a fuel cell such as a solid oxide fuel cell.

In another exemplary embodiment, the chamber 55 is an engine and the hydrogen and the second portion of ammonia are oxidized by combusting the hydrogen and the second portion of ammonia in the engine. In this exemplary embodiment, the apparatus may also include a container such as post-combustion reactor 57 connected to the engine for providing a sufficient amount of the composition to reduce the nitrogen oxides which are formed as by-products of the combustion of the second portion of ammonia. The nitrogen oxides are delivered to the post-combustion reactor 57 and are reduced by the urea in the composition to form nitrogen.

The embodiments of FIGS. 1–5 include means 60 for delivering gaseous substances including ammonia, hydrogen, and nitrogen oxides, as well as means for delivering solutions such as the composition containing urea and water. Means for delivering cold solutions may include, for example, conveying means such as plastic tubing and glass manifolds. Means for delivering hot solutions may include conveying means such as, for example, steel or stainless steel tubes. Means 60 for delivering gaseous substances may include conveying means such as, for example, steel or stainless steel tubes, pumping means such as pumps, or a combination thereof. The pumping means may be used for pumping the gaseous substances to the extent needed to overcome pressure differentials. The embodiments of FIGS. 1–5 also include means 68 for delivering the composition comprising urea and water to the container in which the urea in the composition is reacted.

Figure 6:
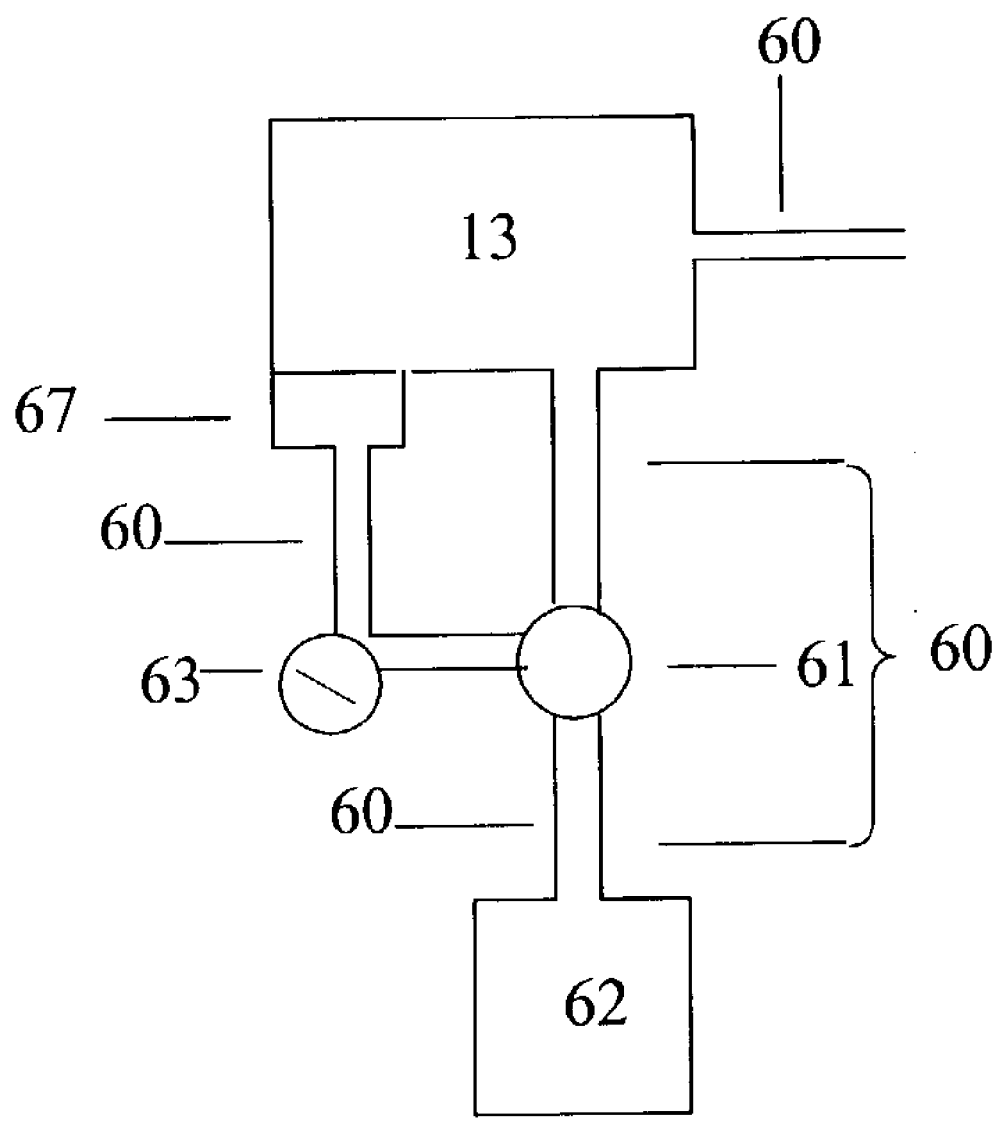
FIG. 6 shows a schematic description of a sixth embodiment of the apparatus of the invention.

The buffer tank 13, 23, or 53 or starter tank 43 in FIGS. 1–5 may be connected to an ammonia source 62, so that the amount of ammonia in the starter or buffer tank is constantly replenished. Suitable ammonia sources 62 may include, for example, an ammonia tank. Alternatively, gaseous ammonia may be generated from the decomposition of an ammonium salt. The embodiments of FIGS. 1–5 may also include a first pressure regulator 63 and an exhaust (the exhaust is not shown in the figures). For example, as shown in FIG. 6, buffer tank 13 is fitted with a pressure sensor 67, and the first pressure regulator 63 is connected to the pressure sensor 67 and to pumping means 61 for pumping ammonia from the source 62 into buffer tank 13. If the pressure sensor 67 indicates that the pressure in buffer tank 13 exceeds a first predetermined value, the first pressure regulator 63 decreases the pumping rate of pumping means 61. Conversely, if the pressure sensor 67 indicates that the pressure in buffer tank 13 falls below a second predetermined value, the first pressure regulator 63 increases the pumping rate of pumping means 61.

Figure 7:
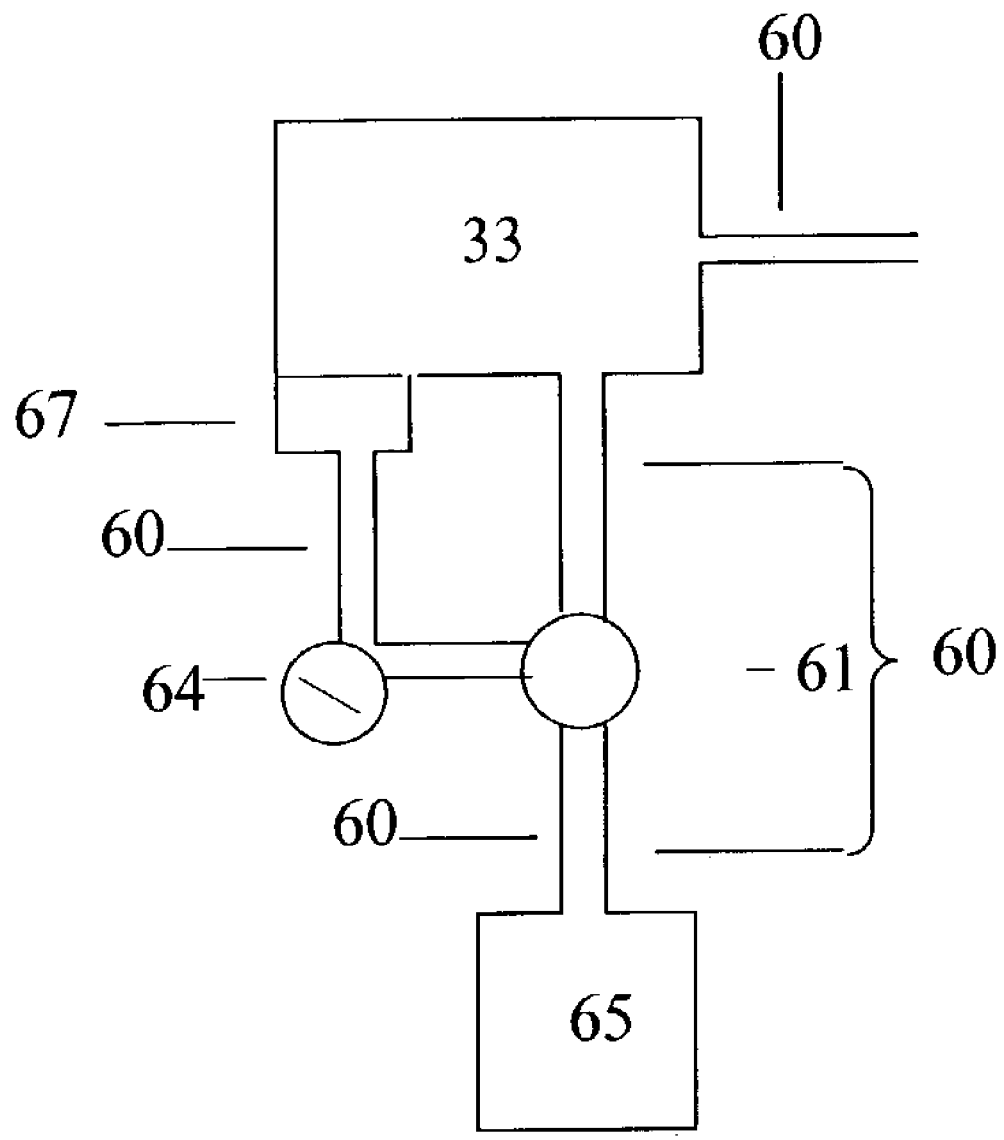
FIG. 7 shows a schematic description of a seventh embodiment of the apparatus of the invention.

Similarly, buffer tank 26 in FIG. 2 or buffer tank 33 in FIG. 3 may be connected to a hydrogen source 65, so that the amount of hydrogen in the buffer tank is constantly replenished. Suitable hydrogen sources 65 may include, for example, a hydrogen tank. The embodiments of FIGS. 2 and 3 may also include a second pressure regulator 64 and an exhaust (the exhaust is not shown in the figures). For example, as shown in FIG. 7, buffer tank 33 is fitted with a pressure sensor 67, and the second pressure regulator 64 is connected to the pressure sensor 67 and to pumping means 61 for pumping hydrogen from the source 65 into buffer tank 33. If the pressure sensor 67 indicates that the pressure in buffer tank 33 exceeds a first predetermined value, the second pressure regulator 64 decreases the pumping rate of pumping means 61. Conversely, if the pressure sensor 67 indicates that the pressure in buffer tank 33 falls below a second predetermined value, the second pressure regulator 64 increases the pumping rate of pumping means 61.

Reactor 12, 22 or 52 in FIGS. 1, 2 and 5, respectively, may be a container for providing an enzyme capable of catalyzing the reaction of urea with water fitted with a first valve such as a fill valve to enable adding the enzyme to reactor 12, 22 or 52 as needed during the course of the reaction. The reactor may also be fitted with a second valve such as a drain valve to enable draining particulate matter which may form during the course of the reaction. Alternatively, the reactor may also be fitted with a fuel filter to prevent build-up of particular matter.

The cost advantage of the present invention may be illustrated as follows. The current spot cost of urea is about $90/ton, or about $0.045/pound, which is competitive with the cost of gasoline. The pH of a concentrated solution of urea is about 7.4, which is very similar to the pH of human blood. Urea has a very low degree of toxicity, is safe to handle, and is well understood thanks to its extensive use as a fertilizer. The energy density of urea is suitable for using urea as an energy source for transportation. One mole of urea is equivalent to two moles of ammonia, which when burned yields 650 Kilojoules. This energy is sufficient for a car weighing two tons to travel about ¼ of a mile. A 50% by weight solution in water of one mole of urea would contain 60 grams of urea and would have a volume of about 100 mls. Accordingly, one gallon of this solution would move a car for about 9 miles, and a 300-mile range could be achieved with a 34 gallon tank. Although such a tank would be larger than a conventional gas tank, the space for the larger tank would be readily available since the fuel tank would no longer need to be insulated from collision as is currently necessary with gas tanks containing flammable liquids. In fact, the liquid component of the composition would be water, a cheap and effective energy-absorbing component in the event of a collision. 34 gallons of the composition described above weigh about 324 pounds. This weight is somewhat larger than the weight an equal volume of gasoline but lies well within design parameters for a standard automobile. Furthermore, the remaining components of the apparatus would weigh less than 100 pounds overall and cost less than $500. All the data discussed above compare very favorably with the corresponding data for other proposed alternative fuels.

A full tank containing 324 pounds of a 50% by weight solution of urea contains 162 pounds of urea, at a cost of $7.30. The corresponding cost is only 42 cents per gallon of the fuel. Even at a 100% profit in the manufacturing and distribution chain, the retail cost of the fuel would be 84 cents per gallon ($14.60 per tankful), which would be significantly less than the cost of gasoline but with a higher profit margin for the sellers of the fuel. Furthermore, urea in the United States is made from air and domestic natural gas, thereby allowing a complete break from foreign oil dependency using existing technology. The fact that urea is the only non-fossil alternative that is cheaper than gasoline also provides an economic incentive to switch from gasoline to a urea based fuel system.

The cost of the composition comprising urea and water used in the present invention is even more advantageous when the cost is calculated on the basis of the cost of urea in countries outside the United States. For example, the cost of urea in Russia can be as low as $35/ton.

The apparatus of the present invention is also flexible enough to provide fuel for both combustion engines and fuel cells. Accordingly, there is no infrastructure barrier to the conversion to fuel cells. The fuel cells would be more efficient than the combustion engine fuel system, so that the costs for fuel cells would be even lower than the cost derived from the above numerical data.

For the embodiment of the invention where hydrogen is oxidized or combusted, the cost may be expressed in terms of the cost of hydrogen obtained from the decomposition of urea. Acceptable costs for fuel cells and internal combustion engines are $3/Kg of hydrogen and $2/Kg of hydrogen, respectively. The cost of hydrogen obtained using urea as a starting material is only about $1/Kg. Accordingly, even with a 100% mark-up from the cost of manufacturing, the cost of hydrogen would be about $2/Kg. In addition, the hydrogen would not have to be stored in large quantities in its highly reactive gaseous form, but it would be produced from urea, which is safe and easy to handle as discussed above.

Urea is produced from the reaction of ammonia gas with carbon dioxide. When reacted in the presence of water, urea generates ammonia and carbon dioxide. Ammonia is a known fuel which can run internal and external combustion engines. The ammonia can also be decomposed to give its constituent elements nitrogen and hydrogen. The hydrogen may then be used in an engine or in a hydrogen fuel cell. As a hydrogen source, urea contains 6.71% by weight of hydrogen. However, upon hydrolysis with one molecule of water, one molecule of urea produces two molecules of ammonia, with two of the hydrogen atoms coming from the water molecule. Accordingly, the ammonia-water system can theoretically yield up to 7.69% of hydrogen. In practice, a 5% yield of hydrogen is attainable. Since the density of a 50% solution by weight of urea in water is 1.145 Kg/l, one liter of urea solution produces about 57 grams of hydrogen or about 80% of the amount of hydrogen available from cryogenic liquid hydrogen, which is 71 grams per liter. The figure of 57 grams of hydrogen per liter is extremely favorable when considering all the positive safety features of a urea based fuel compared to cryogenic liquid hydrogen, as well as the fact that the bulk of a cryogenic tank has an unfavorable effect on the energy density value of cryogenic liquid hydrogen. Furthermore, a composition comprising 70% by weight of urea in water produces about 79 grams of hydrogen per liter, which is larger than the amount of 71 grams per liter available from cryogenic hydrogen, and provides greater energy efficiency and far safety than cryogenic hydrogen.

The present invention also has significant advantages over fossil fuels and many alternative fuels in terms of safety. The present invention gives ammonia on demand, so that at any given time the amount of ammonia present is very low and does not pose any safety concern. The water solution of urea is non-toxic and can be stored in simple plastic or metal tanks at no pressure.

In one embodiment of the invention, as discussed above, ammonia generated from the reaction of urea with water is oxidized or combusted to produce energy. While pure ammonia has also been proposed as a fuel, the use of pure ammonia has several drawbacks. Ammonia is a gas at room temperature and requires high pressure to liquefy. It is a corrosive substance which in large quantities may cause respiratory problems and even death. While it is possible to dissolve ammonia in water to produce a fuel, the resulting fuel has a pH of over 11 and a strong ammonia odor. Finally, ammonia has a relatively low energy density compared to gasoline and other alternative fuels. The use of urea as a source of ammonia in the present invention provides ammonia in low concentrations and thus removes most of the problems associated with storing large quantities of ammonia in a device.

The present invention is also environmentally advantageous. Although carbon dioxide is one of the products of the hydrolysis of urea in reaction (1), an equal amount of carbon dioxide is removed from the atmosphere to make urea in the first place. Accordingly, the production of ammonia according to the invention does not entail any net contribution to greenhouse gas emissions. The other reactant required for the preparation of urea is ammonia, which in turn requires a hydrogen source for its manufacture. Most of the hydrogen used for this purpose is supplied by the process of steam reforming of natural gas, which releases carbon dioxide into the atmosphere. However, hydrogen can also be prepared by an environmentally friendly method such as the electrolysis of water, where the electricity needed for the process is supplied by nuclear, hydroelectric, solar, tidal or wind power, none of which is a greenhouse gas emitting process. In this case, the required amount of carbon dioxide may be obtained by sequestering carbon dioxide from flue gases, or from the atmosphere, which contains 370 ppm $CO_2$, as needed. Accordingly, it is possible using existing technology to prepare urea in a manner that is economical and environmentally friendly compared to fossil fuels.

The invention is further illustrated by the following example(s), which is not intended to limit the scope of the invention in any way.

EXAMPLE 1

1 liter of a 50% by weight urea solution containing 575 gms of urea was heated to 120° C. under a pressure of about 3 atmospheres to spontaneously generate ammonia. After 225 seconds there was no residue left in the reactor. 315 grams of ammonia was collected and burned.

EXAMPLE 2

1 liter of a 50% by weight urea solution containing 575 gms of urea was heated to 100° C. in the presence of 50 grams of vanadium pentoxide catalyst to generate in 280 seconds 315 grams of ammonia. The 315 grams of ammonia could be collected and burned in a subsequent step. The vanadium pentoxide was unaffected and was reused in a similar reaction with a new 50% by weight urea solution.

EXAMPLE 3

1 liter of a 20% by weight urea fuel was placed in a reactor with 1 million IU of urease at 60° C. Ammonia was generated at a constant rate of about 35 grams per minute. The ammonia could be collected and burned in a subsequent step.

What is claimed is:

1. A method for generating energy to power an engine from a composition comprising urea and water, the method comprising:
    (a) reacting the urea with water to form ammonia;
    (b) oxidizing the ammonia formed in step (a) to form water and nitrogen generating energy; and
    (c) using the energy generated in step (b) to power an engine.

2. The method of claim 1, wherein the weight of urea in the composition is equal to about 10% to about 90% of the weight of the water in the composition.

3. The method of claim 1, wherein the urea reacts with water in step (a) at a temperature ranging between about 140° C. and about 240° C. and a pressure ranging between about 30 atmospheres and 50 atmospheres.

4. The method of claim 3, wherein step (a) of the method is catalyst-free.

5. The method of claim 3, wherein the method comprises mixing or contacting the composition with a catalyst capable of catalyzing the reaction of urea with water in step (a).

6. The method of claim 5, wherein the catalyst is an oxide of a metal, wherein the metal is selected from the group consisting of iron, nickel, vanadium and zinc.

7. The method of claim 1, wherein the composition further comprises a component selected from the group consisting of a combustible fuel, a combustion enhancer, and a combination thereof.

8. The method of claim 7, wherein the component is a combustible fuel present in an amount which can be combusted to generate a sufficient amount of heat to initiate a reaction of urea with water.

9. The method of claim 8, wherein the combustible fuel is ammonia.

10. The method of claim 8, wherein the component is a combustion enhancer.

11. The method of claim 1, wherein the method comprises mixing or contacting the composition with an enzyme capable of catalyzing the reaction of urea with water.

12. The method of claim 11, wherein the enzyme is capable of catalyzing the reaction of urea with water at a temperature ranging between room temperature and a temperature at which the half life of the enzyme is less than 1 minute.

13. The method of claim 11, wherein the enzyme is urease.

14. The method of claim 1, wherein step (b) comprises combusting the ammonia formed in step (a).

15. The method of claim 14, wherein nitrogen oxides are formed in step (b) and the method further comprises reacting a sufficient amount of the composition with the nitrogen oxides to reduce the nitrogen oxides.

16. The method of claim 14, wherein the ammonia is combusted in an engine having a compression ratio selected from the group consisting of a compression ratio between 9:1 and 30:1 and a compression ratio greater than 30:1.

17. A method for generating energy to power an engine from a composition comprising urea and water, the method comprising:
    (a) reacting the urea with water in the absence of an oxidizing agent to form hydrogen;
    (b) oxidizing the hydrogen formed in step (a) to form water generating energy; and
    (c) using the energy generated in step (b) to power an engine.

18. The method of claim 17, wherein the weight of urea in the composition is equal to about 10% to about 90% of the weight of the water in the composition.

19. The method of claim 17, wherein the composition is heated at a temperature ranging between about 150° C. and 250° C. and a pressure ranging between about 30 and about 50 atmospheres.

20. The method of claim 17, wherein the composition further comprises a component selected from the group consisting of a combustible fuel, a combustion enhancer, and a combination thereof.

21. The method of claim 17, wherein step (a) comprises contacting the composition with a catalyst capable of catalyzing the reaction of urea with water to form hydrogen.

22. The method of claim 21, wherein the catalyst capable of catalyzing the formation of hydrogen is selected from the group consisting of a catalyst comprising a transition metal, a catalyst comprising a rare earth element, a catalyst comprising an actinide, and a combination thereof.

23. The method of claim 22, wherein the transition metal is selected from the group consisting of platinum, palladium, nickel, cobalt, iron, copper, zinc, titanium, vanadium, molybdenum, rhodium, ruthenium, zirconium, tungsten, rhenium, silver, and gold.

24. A method for powering an engine from a composition comprising urea and water, the method comprising heating the composition to oxidize the urea with an oxidizing agent to form water generating energy to power an engine.

25. The method of claim 24, wherein the weight of urea in the composition is equal to about 10% to about 90% of the weight of the water in the composition.

26. The method of claim 24, wherein the composition is heated at a temperature ranging between about 150° C. and 250° C. and a pressure ranging between about 30 and about 50 atmospheres.

27. The method of claim 24, wherein the composition further comprises a component selected from the group consisting of a combustible fuel, a combustion enhancer, and a combination thereof.

28. The method of claim 24, comprising contacting the composition with a catalyst capable of catalyzing the oxidation of urea.

29. The method of claim 24, wherein the catalyst capable of catalyzing the oxidation of urea is the oxidizing agent.

30. The method of claim 29, wherein the catalyst capable of catalyzing the formation of hydrogen is selected from the group consisting of a catalyst comprising a transition metal, a catalyst comprising a rare earth element, a catalyst comprising an actinide, and a combination thereof.

31. The method of claim 30, wherein the transition metal is selected from the group consisting of platinum, palladium, nickel, cobalt, iron, copper, zinc, titanium, vanadium, molybdenum, rhodium, ruthenium, zirconium, tungsten, rhenium, silver, and gold.

32. A method for generating energy from a composition comprising urea and water, comprising:
  (a) reacting the urea with water to form ammonia;
  (b) dividing the ammonia formed in step (a) into a first portion and a second portion;
  (c) converting the first portion of ammonia into nitrogen and hydrogen; and
  (d) oxidizing the hydrogen formed in step (c) and the second portion of ammonia to form nitrogen and water generating energy.

33. The method of claim 32, wherein the weight of urea in the composition is equal to about 10% to about 90% of the weight of the water in the composition.

34. The method of claim 32, wherein the urea reacts with water in step (a) at a temperature ranging between about 140° C. and about 240° C. and a pressure ranging between about 30 atmospheres and 50 atmospheres.

35. The method of claim 34, wherein step (a) of the method is catalyst-free.

36. The method of claim 34, wherein the method comprises mixing or contacting the composition with a catalyst capable of catalyzing the reaction of urea with water in step (a).

37. The method of claim 36, wherein the catalyst is an oxide of a metal, wherein the metal is selected from the group consisting of iron, nickel, vanadium and zinc.

38. The method of claim 32, wherein the method comprises mixing or contacting the composition with an enzyme capable of catalyzing the reaction of urea with water.

39. The method of claim 36, wherein the enzyme is capable of catalyzing the reaction of urea with water at a temperature ranging between room temperature and a temperature at which the half life of the enzyme is less than 1 minute.

40. The method of claim 36, wherein the enzyme is urease.

41. The method of claim 32, wherein step (d) comprises combusting the hydrogen and the second portion of the ammonia.

42. The method of claim 32, wherein step (c) comprises mixing or contacting the first portion of ammonia with a catalyst capable of catalyzing the conversion of ammonia into nitrogen and hydrogen.

43. The method of claim 42, wherein the catalyst is iron (II) oxide or iron (III) oxide.

44. A method for driving a pneumatic device, comprising:
  (a) providing a composition comprising urea and water;
  (b) oxidizing the urea with an oxidizing agent in the presence of a catalyst to generate energy and form a plurality of gaseous substances under pressure; and
  (c) directing the plurality of gaseous substances formed under pressure into the pneumatic device to drive the pneumatic device.

* * * * *